No. 781,146. PATENTED JAN. 31, 1905.
T. A. JOHNSON.
ROADWAY AND VEHICLE FOR TRAVELING THEREON.
APPLICATION FILED MAY 7, 1904.
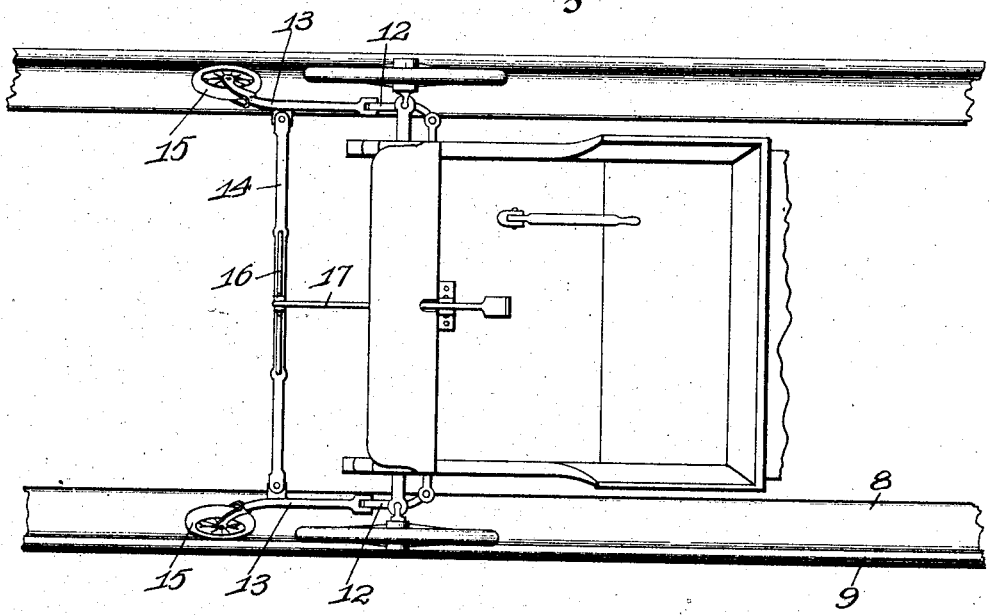
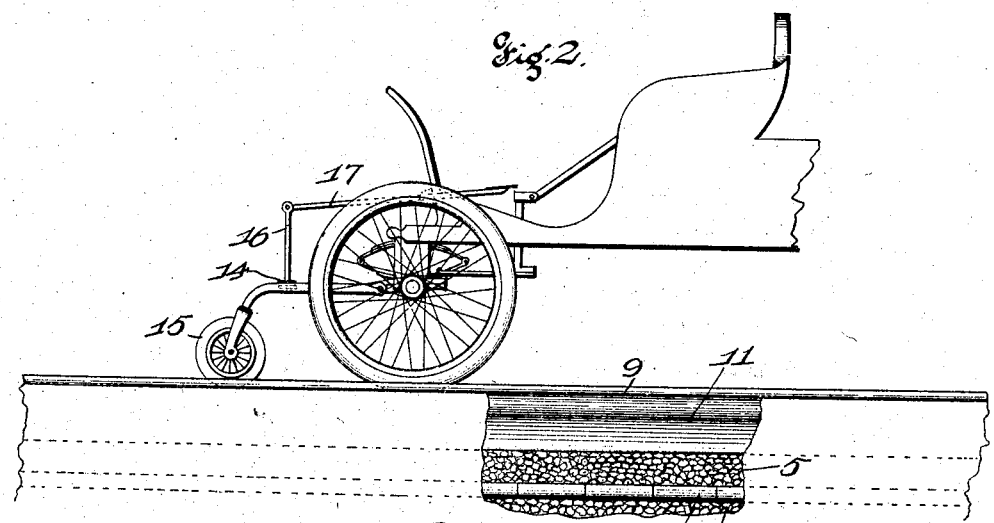
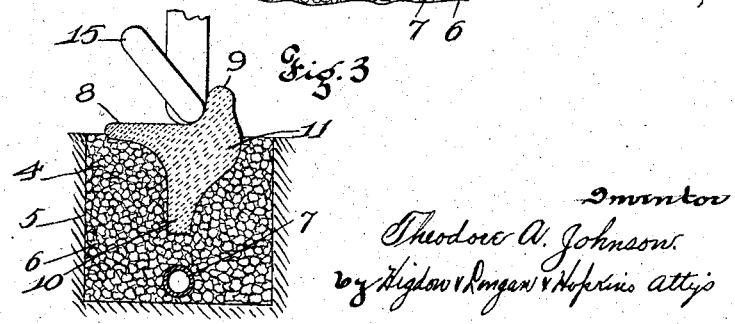
Witnesses
Alfred A. Ficks
Edw. M. Warrington
Inventor
Theodore A. Johnson.
by Bigelow, Morgan & Hopkins Attys No. 781,146.  
Patented January 31, 1905.

UNITED STATES PATENT OFFICE.

THEODORE A. JOHNSON, OF XENIA, ILLINOIS.

ROADWAY AND VEHICLE FOR TRAVELING THEREON.

SPECIFICATION forming part of Letters Patent No. 781,146, dated January 31, 1905.

Application filed May 7, 1904. Serial No. 206,845.

*To all whom it may concern:*

Be it known that I, THEODORE A. JOHNSON, a citizen of the United States, and a resident of Xenia, Clay county, Illinois, have invented certain new and useful Improvements in Roadways and Vehicles for Traveling Thereon, of which the following is a specification containing a full, clear, and exact description, reference being had to the accompanying drawings, forming a part hereof.

My invention relates to a roadway and vehicle for traveling thereon; and it consists of the novel features herein shown, described, and claimed.

This invention relates to an improvement on a roadway for a motor-propelled vehicle and an improvement in that vehicle whereby friction or wear on pneumatic or rubber tires is obviated.

Among the objects of the improvement in said roadway is to permit, first, economical construction with non-destructible material with the uses for which it is designed; second, that it is designed for vehicles of regular service and to allow the use of private vehicles, such as automobiles now in use; third, that it may be constructed along highways or independently connecting points more directly; fourth, that it may be used for passenger, mail, express, and light freight traffic, thereby furnishing to neighborhoods, villages, and small towns that rapid transit which the times require with that reasonable outlay of capital that will guarantee profit upon investment.

Among the objects of the improvement in vehicles is to provide an automatic steering apparatus suitable for attachment to any ordinary vehicle which will engage the roadway and steer the vehicle, so as to keep the tires of the vehicle from contacting with the flanges of the roadway and so as to avoid the necessity of the operator giving constant attention to the work of steering.

In the drawings, Figure 1 is a plan view illustrating my invention. Fig. 2 is a side elevation, parts being broken away to economize space and parts being shown in section to illustrate the construction. Fig. 3 is a cross-section of one of the rails of the roadway.

Referring to the drawings in detail, the road-bed 4 will be constructed of earth or other suitable material, and parallel trenches 5 will be dug or formed in the face of the road-bed, said trenches being square, rectangular, or any other suitable form in cross-section. A bed 6, of granulated material—such as cinders, gravel, or a composition formed by burning earth with bituminous coal or other suitable material—is laid in each of the trenches, the drain-pipe 7 being embedded in the material during the operation of forming the bed. A stamp, pattern, or former is used to fit the upper face of each bed to receive the rails. The rails are constructed of granitoid, cement, or other plastic material which will harden, and each rail consists of the tread portion 8, the upper face of which occupies a substantially horizontal position, being slightly inclined inwardly, the guide-flange portion 9 extending upwardly outside of the tread portion, the tread-strengthening rib 10 extending downwardly from the tread portion, and the guide-flange reinforcement 11 outside of the guide-flange and connecting the guide-flange to the rib 10. The rails are cast in position and are continuous.

The arms 12 extend forwardly from the vertical pivots of the front axles, and the steering-wheel frames 13 are hinged to the forward ends of these arms 12 to swing vertically and not horizontally. A connecting-rod 14 connects the frames 13 pivotally together, and the steering-wheels 15 are mounted in the forward ends of the frames 13, said wheels being inclined at an angle of substantially forty-five degrees, so as to engage the inner faces of the guide-flanges 9. A yoke 16 extends upwardly from the center of the connecting-rod 14, and a foot-lever 17 is pivoted through the dashboard, so that the operator may raise the steering-wheels 15 out of engagement with the rails and flanges when it is desired to move the vehicle off the track. The flanges 9 should be far enough apart so that the traction-wheels of the vehicle will run upon the treads 8 and out of engagement with the flanges, and the steering-wheels 15 should be far enough apart to engage closely inside of the flanges 9 and steer the vehicle so as to keep the traction-wheels from engaging the flanges. The vehicle cannot leave the track as long as the steering-wheels are in position against the flanges 9. When the vehicle is to be used upon comparatively straight roads, it will only be necessary to attach the steering device to the front wheels, as shown and described. If, however, the vehicle is to be used upon roads having frequent turns and it is desired to keep the tires of the rear wheels from contacting with the guide-flanges, a duplicate of the steering device may be attached to the rear wheels. At the curves the tracks should be laid with special reference to the position the rear wheels will occupy in making a curve. In other words, the flanges 9 should be spaced wider apart at the curves than on a straight line.

The steering device may be clamped to the vehicle so that it may be removed and so that the steering device may be manufactured independently and applied to vehicles of different styles. I have shown the device hinged to arms formed integral with the axles; but it is obvious that these arms may be made separate and clamped to the axle.

It is not necessary that a special road-bed be prepared for the track. The trenches may be made through the level of the earth.

I claim—

1. A roadway for vehicles comprising: parallel tracks, each track consisting of a bed in the roadway, and a rail cast in position upon the bed; said rail comprising the tread portion 8; the guide-flange portion 9 extending upwardly outside of the tread portion; the tread-strengthening rib 10 extending downwardly from the tread portion; and the guide-flange reinforcement 11 outside of the guide-flange and connecting the guide-flange to the strengthening-rib; substantially as specified.

2. The combination with a roadway having guide-flanges, of a wheeled vehicle having a steering device comprising inclined wheels adapted to engage the guide-flanges of the roadway; and a frame pivotally connecting the wheels to the steering-gear of the vehicle; substantially as specified.

In testimony whereof I have signed my name to this specification in presence of two subscribing witnesses.

THEODORE A. JOHNSON.

Witnesses:
 EDWARD E. LONGAN,
 ALFRED A. EICKS.